(12) United States Patent
Iijima et al.

(10) Patent No.: US 7,651,818 B2
(45) Date of Patent: Jan. 26, 2010

(54) LITHIUM ION SECONDARY BATTERY AND CHARGING METHOD THEREFOR

(75) Inventors: Tsuyoshi Iijima, Tokyo (JP); Kazuya Ogawa, Tokyo (JP)

(73) Assignee: TDK Corporation, Tokyo (JP)

( * ) Notice: Subject to any disclaimer, the term of this patent is extended or adjusted under 35 U.S.C. 154(b) by 372 days.

(21) Appl. No.: 11/174,477

(22) Filed: Jul. 6, 2005

(65) Prior Publication Data

US 2006/0008705 A1    Jan. 12, 2006

(30) Foreign Application Priority Data

Jul. 6, 2004    (JP) .......................... P.2004-199510

(51) Int. Cl.
| | | |
|---|---|---|
| H01M 4/58 | (2006.01) | |
| H01M 4/00 | (2006.01) | |
| H01M 4/50 | (2006.01) | |
| H02J 7/00 | (2006.01) | |

(52) U.S. Cl. .................. 429/231.95; 429/223; 429/224; 320/127; 320/128

(58) Field of Classification Search .......... 320/137–165
See application file for complete search history.

(56) References Cited

U.S. PATENT DOCUMENTS

| | | | |
|---|---|---|---|
| 6,403,266 B1 * | 6/2002 | Kim et al. .................... | 429/314 |
| 6,589,694 B1 * | 7/2003 | Gosho et al. ............. | 429/231.1 |
| 2003/0118904 A1 * | 6/2003 | Hosokawa et al. .......... | 429/217 |
| 2004/0072072 A1 * | 4/2004 | Suzuki et al. ............ | 429/231.1 |

FOREIGN PATENT DOCUMENTS

| | | |
|---|---|---|
| CN | 1348229 A | 5/2002 |
| JP | 5-111184 | 4/1993 |
| JP | 2004-342500 | 12/2004 |
| KR | 2000-0073379 | 12/2000 |
| KR | 10-2004-0037154 | 5/2004 |

* cited by examiner

*Primary Examiner*—Dah-Wei D Yuan
*Assistant Examiner*—Maria J Laios
(74) *Attorney, Agent, or Firm*—Oblon, Spivak, McClelland, Maier & Neustadt, L.L.P.

(57) ABSTRACT

A lithium ion secondary battery having a positive electrode 3 which contains, as a positive electrode active material, a composite metal oxide containing at least one of Li, Co, Mn, and Ni as a metal component thereof; a negative electrode 2 which contains a negative electrode active material; and a nonaqueous electrolyte solution containing a lithium salt. A charging method is characterized in that constant-current charging is performed with use of a set charging current value of equal to or greater than 0.5C and less than 2C ("C" referred to here is a rated capacity value of said lithium ion second battery).

17 Claims, 2 Drawing Sheets

LITHIUM ION SECONDARY BATTERY AND CHARGING METHOD THEREFOR

BACKGROUND OF THE INVENTION

The present invention relates to a lithium ion secondary battery and a charging method therefor. In particular, the invention relates to a lithium ion secondary battery which is charged with a simple operation and at low cost by making use of a charging device having a simple circuit configuration, and a charging method therefor.

A lithium ion secondary battery has characteristics of having large capacity and high energy density, exhibiting an excellent charge-and-discharge cycle characteristic, and being capable of maintaining a rated output for a long period of time. Therefore, lithium ion secondary batteries are widely used as driving batteries for a variety of devices, such as a cellular phone, a notebook computer, or a PDA.

Constant-current and constant-voltage charging is usually employed for charging a lithium ion secondary battery. In the constant-current and constant-voltage charging, first, a battery is charged with constant current until a voltage reaches a predetermined upper limit voltage; and thereafter, the voltage is maintained at the predetermined upper limit voltage. When the battery is set a constant-voltage mode, a current value decreases. Hence, charging is completed at a point in time where the current value falls to a given current value (see, e.g., JP-A-5-111184).

However, since a lithium ion secondary battery employs a nonaqueous electrolyte solution having high electrical resistance as a solvent of an electrolyte solution, a problem that full charging of a lithium ion secondary battery requires a long period of time has arisen.

Conceivable methods for reducing time required for charging a lithium ion secondary battery through constant-current and constant-voltage charging include a method of setting a charging current value to a high value during constant-current charging, and a method of setting an upper limit voltage value to a high value during the same.

However, when a lithium ion secondary battery which employs $LiCoO_2$ as a positive electrode active material is charged with excessively high current or excessively high voltage, there arises a problem that desorption of Li from the positive electrode active material occurs to an excessive extent, thereby destroying lattices, and deteriorating the charge/discharge cycle characteristics.

Accordingly, when a lithium ion secondary battery employs a carbonaceous material as a negative electrode active material, the battery must be charged as follows. That is, an upper limit voltage value is set to +4.2 V; the battery is charged with constant current of 1 CA (a current value corresponding to a rated capacity value (Ah) of the lithium ion secondary battery) or less; and thereafter, the battery is charged with constant voltage while the voltage value is controlled at a high accuracy of +4.2±0.05 V In addition, when the negative electrode active material is lithium titanate, the upper limit voltage value must be set to +2.7 V, and the voltage value during constant-voltage charging must be controlled at a high accuracy of +2.7±0.05 V As described above, in the related-art method for charging a lithium ion secondary battery, monitoring of not only a voltage value but also of a current value is indispensable, thereby raising a problem of charging operation being complicated.

SUMMARY OF THE INVENTION

To this end, the present invention aims at providing a method for charging a lithium ion secondary battery which can charge a lithium ion secondary battery with a simple operation and at low cost by making use of a charging device having a simple circuit configuration.

To achieve the object, the inventors have conducted extensive studies and found the following. A thin-layer lithium ion secondary battery has low impedance. Accordingly, when the battery is charged with constant current with use of a set charging current value equal to or greater than 0.5C and less than 2C ("C" referred to here is a rated capacity value of the lithium ion secondary battery) while only a voltage value is monitored, the lithium ion secondary battery can be charged to a sufficiently high charge capacity.

The present invention has been conceived on the basis of the above-mentioned knowledge. According to the invention, a lithium ion secondary battery includes a positive electrode which contains, as a positive electrode active material, a composite metal oxide containing at least one of Li, Co, Mn, and Ni as a metal component thereof; a negative electrode which contains a negative electrode active material; and a nonaqueous electrolyte solution containing a lithium salt. The method comprises constant-current charging with use of a set charging current value equal to or greater than 0.5C and less than 2C ("C" referred to here is a rated capacity value of the lithium ion second battery).

According to the invention, a lithium ion secondary battery can be charged with constant-current charging and with monitoring of only a voltage value. Consequently, a lithium ion secondary battery can be charged with a simple operation and at low cost by making use of a charging device having a simple circuit configuration.

In the invention, an electrode serving as a negative electrode or a positive electrode functions as a reaction field where electron transfer reaction—where lithium ions (or metal lithium) are involved as a redox species—can be caused to proceed. The expression "to cause electron transfer reaction to proceed" referred to here means to cause electron transfer reaction to proceed within a battery life required for the battery to serve as a power supply or as an auxiliary power supply of a device on which the battery is to be mounted.

In the present invention, the terms "negative electrode" and "positive electrode" denote electrodes determined with reference to a polarity of a battery during discharge. More specifically, a negative electrode is an electrode which emits electrons as a result of oxidation reaction during discharge; and a positive electrode is an electrode which accepts electrons as a result of reduction reaction during discharge.

In a preferred embodiment of the invention, the positive electrode supports 5 to 12 mg/cm² of the positive electrode active material, and the negative electrode supports 3 to 6 mg/cm² of the negative electrode active material.

According to another preferred embodiment of the invention, an amount of a positive electrode active material supported on a positive electrode is 5 to 12 mg/cm², and an amount of a negative electrode active material supported on a negative electrode is 3 to 6 mg/cm²; and a lithium ion secondary battery is formed into a thin layer and is of sufficiently low impedance. Accordingly, when the lithium ion secondary battery is charged with constant-current charging with use of a set charging current value equal to or greater than 0.5C and less than 2C while only a voltage value is monitored, the battery can be charged to a sufficiently high charge capacity.

In further preferred embodiment of the invention, the lithium ion secondary battery comprises a plurality of laminate units laminated with a separator therebetween, each laminate unit including the positive electrode, a separator, and the negative electrode while being laminated one on top of the other.

The invention provides a method for charging a lithium ion secondary battery which can charge a lithium ion secondary battery with a simple operation and at low cost by making use of a charging device having a simple circuit configuration.

DETAILED DESCRIPTION OF THE PREFERRED EMBODIMENTS

Hereinbelow, a preferred embodiment of the present invention will be described in detail by reference to the appended drawings.

Figure 1:
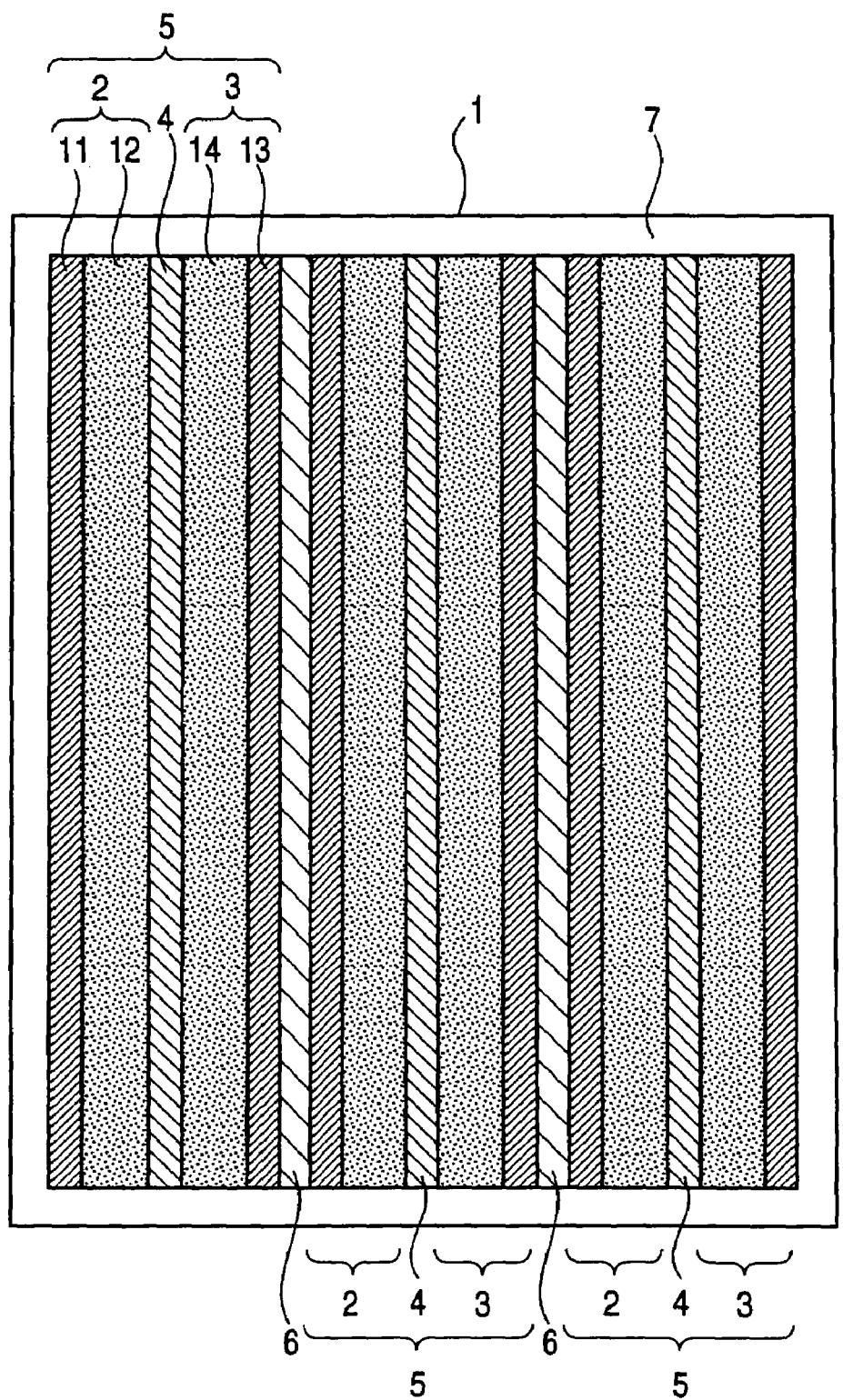
FIG. 1 is a schematic cross-sectional view of a lithium ion secondary battery to be charged in accordance with a method for charging a lithium ion secondary battery according to a preferred embodiment of the invention.

FIG. 1 is a schematic cross-sectional view of a lithium ion secondary battery to be charged in accordance with a method for charging a lithium ion secondary battery according to a preferred embodiment of the invention.

As shown in FIG. 1, a lithium ion secondary battery 1 has the configuration in which three laminate units 5 are laminated with tabular separators 6 therebetween. Each of the laminate units 5 is configured such that a tabular negative electrode 2 and a tabular positive electrode 3 are laminated with a tabular separator 4 therebetween. A nonaqueous electrolyte solution (not shown) is impregnated inside the negative electrode 2 and inside the positive electrode 3. The three laminate units 5, being laminated one on another with the separators 6 therebetween, are encased in a case 7 in a sealed manner.

In the embodiment, the negative electrode 2 constituting each of the laminate units 5 supports 3 to 6 mg/cm² of a negative electrode active material; and the positive electrode 3 constituting the same supports 5 to 12 mg/cm² of a positive electrode active material. Accordingly, each of the laminate units 5 is formed into an extremely thin layer.

In relation to the above, the negative electrode 2 and the positive electrode 3 are determined with reference to a polarity of the lithium ion secondary battery 1 during discharge. During charging, the negative electrode 2 serves as an anode; and the positive electrode 3 serves as a cathode.

As shown in FIG. 1, each of the negative electrodes 2 comprises a collector sheet 11, and a negative-electrode-active-material-containing layer 12 formed on the collector sheet 11. Each of the positive electrodes 3 comprises a collector sheet 13, and a positive-electrode-active-material-containing layer 14 formed on the collector sheet 13.

No specific limitation is imposed on the collector sheets 11 and 13; and an essential requirement for a material used in forming the collector sheet 11 is to be a good conductor capable of transferring sufficient electric charges to the negative-electrode-active-material-containing layer 12, and an essential requirement for the collector sheet 13 is to be a good conductor capable of transferring sufficient electric charges to the negative-electrode-active-material-containing layer 14. Accordingly, the collector sheets 11 and 13 can be formed from a material, such as metal foil of aluminum, copper, or the like, employed in a collector sheet of a known lithium ion secondary battery.

The negative-electrode-active-material-containing layer 12 of the negative electrode 2 is primarily formed from a negative electrode active material, a conductive aid, and a binder.

No specific limitation is imposed on the negative electrode active material, and a known negative electrode active material can be employed, so long as it is capable of causing de-intercalation and intercalation of lithium ions, or doping and de-doping between lithium ions and counter anions (e.g., $ClO_4^-$) of the lithium ions to proceed in a reversible manner. Examples of such an active material include carbon materials, such as natural graphite, artificial graphite, or low-temperature-baked carbon; a metal capable of being chemically combined with lithium, such as Al, Si, or Sn; an amorphous chemical compound whose primary component is an oxide, such as $SiO_2$ or $SnO_2$; and lithium titanate ($Li_4Ti_5O_{12}$).

As the negative electrode active material, a conductive carbon material (graphite and amorphous carbon) or lithium titanate is particularly preferable. As the carbon material, a carbon material whose interlaminar distance $d_{0002}$ falls within a range of 0.335 to 0.338 nm and whose crystallite size $Lc_{0002}$ falls within a range of 30 to 120 nm is further preferable. Examples of a carbon material satisfying such a condition include natural graphite, artificial graphite, and MCF (mesocarbon fiber). Meanwhile, the interlaminar distance $d_{0002}$ and the crystallite size $Lc_{0002}$ can be obtained by means of X-ray diffractometery.

No specific limitation is imposed on the conductive aid, and a known conductive aid can be employed. Examples of the conductive aid include metal fine particles of carbon blacks, carbon materials, copper, nickel, stainless steel, iron, and the like; mixtures of carbon material and metal fine particles; and conductive oxides, such as ITO.

No specific limitation is imposed on the binder, so long as it is capable of binding particles of the negative electrode active material with particles of the conductive aid. Examples of the binder include fluoroplastics, such as polyvinylidene difluoride (PVDF), polytetrafluoroethylene (PTFE), tetrafluoroethylene-hexafluoropropylene copolymer (FEP), tetrafluoroethylene-perfluoroalkylvinyl ether copolymer (PFA), ethylene-tetrafluoroethylene copolymer (ETFE), polychlorotrifluoro-ethylene (PCTFE), ethylene-chlorotrifluoroethylene copolymer (ECTFE), and polyvinylidene fluoride (PVF). The binder contributes to binding onto the collector sheet 11, as well as binding between the particles of the negative electrode active material and those of the conductive aid.

An electronic conductive porous material is preferably contained in the negative-electrode-active-material-containing layer 12. Examples of the electronic conductive porous material include carbon blacks, such as acetylene black or Ketjen black.

Similar to the negative-electrode-material-containing layer 12, the positive-electrode-active-material-containing layer 14 of the positive electrode 3 is primarily formed from a positive electrode active material, a conductive aid, and a binder.

In the present embodiment, as the positive electrode active material, the positive electrode 3 includes a composite metal oxide containing at least one of Li, Mn, and Ni as a metal element.

Furthermore, the same materials as those forming the negative-electrode-active-material-containing layer 12 can be employed as the respective constituent elements in the positive-electrode-active-material-containing layer 14 exclusive of the positive electrode active material. In addition, the binder to be contained in the positive-electrode-active-material-containing layer 14 also contributes to binding onto the collector sheet 13, as well as binding between particles of the positive electrode active material and particles of the conductive aid. An electron-conductive porous material is preferably contained in the positive-electrode-active-material-containing layer 13 as well.

No specific limitation is imposed on the separator 4 to be interposed between the negative electrode 2 and the positive electrode 3, or on the separator 6 to be interposed between the laminate units 5, so long as the separators are formed from an insulating porous material; and a separator employed in a known lithium ion secondary battery can be employed therefor. Examples of the insulating porous material include a laminate film of polyethylene, polypropylene, or polyolefin; a stretched film of a mixture of these resins; and fiber nonwoven cloth formed from at least one constituent material selected from a group consisting of cellulose, polyester, and polypropylene.

The nonaqueous electrolyte solution is filled in a space inside the case 7, and a portion of the nonaqueous electrolyte solution is contained inside the negative electrode 2, the positive electrode 3, and the separator 4. As the nonaqueous electrolyte solution, that obtained by means of dissolving a lithium salt in a nonaqueous solvent (an organic solvent) is employed. Examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. Meanwhile, these salts may be used solely or in combination of two or more. In addition, the nonaqueous electrolyte solution may be gelled by means of adding a gelling agent, such as a gel polymer.

Examples of the nonaqueous solvent for the nonaqeous electrolyte solution include those composed of propylene carbonate, ethylene carbonate, and/or diethyl carbonate.

The case 7 is formed from a flexible film. Since such a film is lightweight and can be easily formed into a thin layer, a lithium ion secondary battery itself can be formed into a thin layer. Consequently, the energy density per volume of a space where the lithium ion secondary battery is to be placed can be increased easily, as can the intrinsic energy density per volume of the lithium ion secondary battery.

In addition, from a viewpoint of effectively preventing intrusion of moisture and the air inside the case 7 from the outside and dissipation of electrolytic components to the outside of the case 7 while ensuring sufficient mechanical strength and the light weight of the case 7, the film is preferably a composite packaging film having at least an innermost layer formed from a synthetic resin to be brought into contact with the nonaqueous electrolyte solution, and a metal layer disposed above the innermost layer. The composite packaging film is further preferably formed from at least three layers constituted of an innermost layer to be brought into contact with the nonaqueous electrolyte solution; an outermost layer which is formed from a synthetic resin and disposed on the outer surface of the case 7, the most distant side from the innermost layer; and at least one metal layer disposed between the innermost layer and the outermost layer.

No specific limitation is imposed on the innermost layer, so long as it has flexibility, chemical stability (characteristics of not inducing chemical reaction, dissolving, and swelling) with respect to the nonaqueous electrolyte solution to be employed and chemical stability with respect to oxygen and water (moisture in the air). However, a material having a characteristic of low permeability against oxygen, water (moisture in the air), and components in the nonaqueous electrolyte solution is preferable. Examples of such a material include thermoplastics such as polyethylene, polypropylene, acid-modified polyethylene, acid-modified polypropylene, polyethylene ionomer, and polypropylene ionomer.

The metal layer is preferably a layer formed from a metal material of high corrosion resistance to oxygen, water (moisture in the air), and the nonaqueous electrolyte solution. As the metal layer, for instance, a metal foil formed from aluminum, an aluminum alloy, titanium, chrome, or the like, can be employed.

In the embodiment, the lithium ion secondary battery 1 configured as above is charged as follows.

Figure 2:
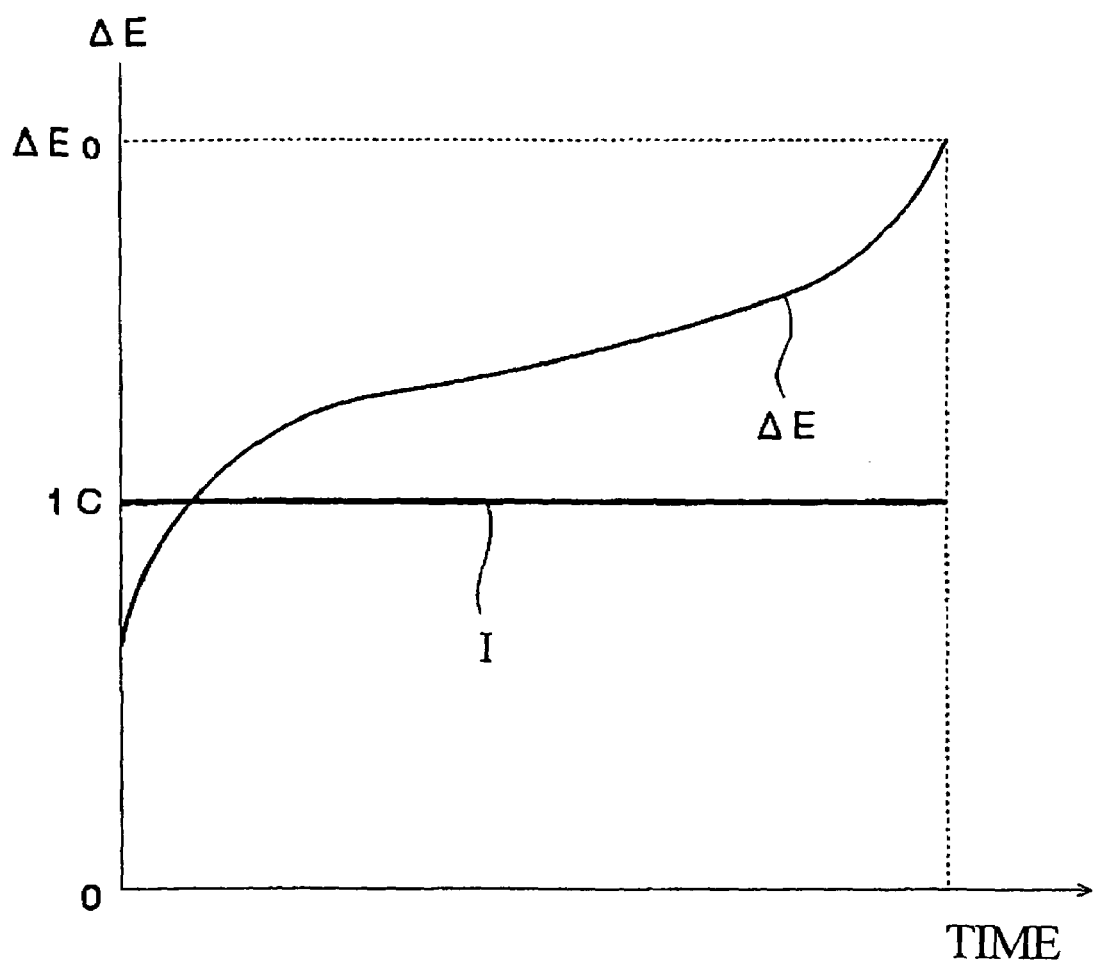
FIG. 2 is a graph schematically showing changes with time in voltage and that in charging current of the lithium ion secondary battery 1.

FIG. 2 is a graph schematically showing changes with time in voltage and those in charging current of the lithium ion secondary battery 1.

First, a controller (not shown) sets a charging current value I to 1C, and charging of the lithium ion secondary battery 1 is started with constant current. "C" referred to here is a rated capacity value of the lithium ion secondary battery 1.

As shown in FIG. 2, as the constant-current charging proceeds, a voltage value $\Delta E$ of the lithium ion secondary battery 1 increases.

During constant-current charging, the controller monitors the voltage value $\Delta E$ of the lithium ion secondary battery 1. The constant-current charging is continued until the voltage value $\Delta E$ of the lithium ion secondary battery 1 increases to a set voltage value $\Delta E0$; e.g., 4.2 V, having been set in advance.

When the voltage value $\Delta E$ of the lithium ion secondary battery 1 has increased to the set voltage value $\Delta E0$, the controller terminates charging of the lithium ion secondary battery 1.

In the embodiment, an amount of the positive electrode active material supported on the positive electrode 3 is 5 to 12 $mg/cm^2$, and an amount of the negative electrode active material supported on the negative electrode 2 is 3 to 6 $mg/cm^2$; and a lithium ion secondary battery is a thin layer and of sufficiently low impedance. Hence, by means of performing constant-current charging with use of a set charging current value of 1 C, the lithium ion secondary battery can be charged to a sufficiently-high charge capacity. Accordingly, charging of a lithium ion secondary battery can be completed while monitoring only a voltage value, and the lithium ion secondary battery 1 can be charged through an extremely simple operation and at low cost by making use of a charging device having a simple circuit configuration.

EXAMPLES

Hereinbelow, for the purpose of further clarifying effects of the invention, examples thereof will be described.

Example 1

First, a negative electrode was fabricated as follows.

Ninety parts by weight of artificial graphite serving as a negative electrode active material, 2 parts by weight of carbon black serving as a conductive aid, and 8 parts by weight of polyvinylidene difluoride (PVDF) serving as a binder were mixed. Thereafter, N-methyl-pyrrolidone (NMP) was added, thereby obtaining a slurry. The thus-obtained slurry was coated on an electrolytic copper foil serving as a collector sheet, with use of a doctor blade, and dried at 110° C. for 20 minutes. The drying was followed by pressing, thereby fabricating a negative electrode. The amount of the negative electrode active material supported on the negative electrode was 3.5 mg/cm².

Meanwhile, a positive electrode was fabricated as follows.

Ninety parts by weight of $LiMn_{1/3}Ni_{1/3}Co_{1/3}O_2$ serving as a positive electrode active material, 6 parts by weight of carbon black serving as a conductive aid, and 4 parts by weight of polyvinylidene difluoride (PVDF) serving as a binder were mixed. Thereafter, N-methyl-2-pyrrolidone was added, thereby obtaining a slurry. The thus-obtained slurry was coated on an aluminum foil serving as a collector sheet, with use of a doctor blade, and dried at 110° C. for 20 minutes. The drying was followed by pressing, thereby fabricating a positive electrode. The amount of the positive electrode active material supported on the positive electrode was 5.5 mg/cm².

A nonaqueous electrolyte solution was fabricated as follows. Propylene carbonate (PC), ethylene carbonate (EC), and diethylcarbonate (DEC) were mixed at a given volume ratio to obtain a solvent; and 1.5 mol of $LiPF_6$ was added thereto as a solute.

The thus-fabricated negative and positive electrodes were laminated with separators interposed therebetween, thereby fabricating laminate units. The laminate units were sealed in an aluminum laminate pack, and the nonaqueous electrolyte solution was filled therein. Thereafter, the pack was vacuum-sealed, thereby fabricating a lithium ion secondary battery which measured 20 mm×42 mm and had a capacity of about 100 mAh.

AC impedance at 1 kHz of the thus-obtained lithium ion secondary battery was measured using SOLARTRON 12608W (trade name; manufactured by SOLARTRON Analytical), whereby a value of 65 mΩ was obtained.

The thus-fabricated lithium ion secondary battery was subjected to constant-current charging with a constant current value (100 mA), corresponding to a charging current value of 1C, at 25° C. until the voltage value increased to 4.2 V, and a charge capacity 4.2V-1CCC was measured.

Furthermore, similarly, the thus-fabricated lithium ion secondary battery was subjected to constant-current charging with a constant current value (100 mA), corresponding to a charging current value of 1C, at 25° C. until the voltage value increased to 4.2 V Subsequently, the battery was subjected to constant-voltage charging while maintaining the voltage value at 4.2 V until the charging current value fell to 5 mA, and a charge capacity 4.2V-1CCCCV was measured.

A ratio between the thus-measured charge capacity 4.2V-1CCC and the charge capacity 4.2V-1CCCCV was calculated to be 98.2%.

Example 2

A lithium ion secondary battery was fabricated in the same manner as in Example 1, except that the amount of the positive electrode active material supported on the positive electrode was set to 6.2 mg/cm² and the amount of the negative electrode active material supported on the negative electrode was set to 4.0 mg/cm².

AC impedance at 1 kHz of the thus-obtained lithium ion secondary battery was measured using SOLARTRON 12608W (trade name; manufactured by SOLARTRON Analytical), whereby a value of 70 mΩ was obtained.

Subsequently, the thus-obtained lithium ion secondary battery was subjected to constant-current charging with a constant current value (100 mA), corresponding to a charging current value of 1C, at 25° C. until the voltage value increased to 4.2 V, and a charge capacity 4.2V-1CCC was measured.

Furthermore, similarly, the thus-fabricated lithium ion secondary battery was subjected to constant-current charging with a constant current value (100 mA) corresponding to a charging current value of 1C, at 25° C. until the voltage value increased to 4.2 V Subsequently, the battery was subjected to constant-voltage charging while maintaining the voltage value at 4.2 V until the charging current value fell to 5 mA, and a charge capacity 4.2V-1CCCCV was measured.

A ratio between the thus-measured charge capacity 4.2V-1CCC and the charge capacity 4.2V-1CCCCV was calculated to be 97.0%.

Example 3

A lithium ion secondary battery was fabricated in the same manner as in Example 1, except that the amount of the positive electrode active material supported on the positive electrode was set to 7.7 mg/cm² and the amount of the negative electrode active material supported on the negative electrode was set to 4.5 mg/cm².

AC impedance at 1 kHz of the thus-obtained lithium ion secondary battery was measured using SOLARTRON 12608W (trade name; manufactured by SOLARTRON Analytical), whereby a value of 90 mΩ was obtained.

Subsequently, the thus-obtained lithium ion secondary battery was subjected to constant-current charging with a constant current value (100 mA), corresponding to a charging current value of 1C, at 25° C. until the voltage value increased to 4.2 V, and a charge capacity 4.2V-1CCC was measured.

Furthermore, similarly, the thus-fabricated lithium ion secondary battery was subjected to constant-current charging with a constant current value (100 mA), corresponding to a charging current value of 1C, at 25° C. until the voltage value increased to 4.2 V Subsequently, the battery was subjected to constant-voltage charging while maintaining the voltage value at 4.2 V until the charging current value fell to 5 mA, and a charge capacity 4.2V-1CCCCV was measured.

A ratio between the thus-measured charge capacity 4.2V-1CCC and the charge capacity 4.2V-1CCCCV was calculated to be 96.8%.

Example 4

A lithium ion secondary battery was fabricated in the same manner as in Example 1, except that the amount of the positive electrode active material supported on the positive electrode was set to 10.0 mg/cm² and the amount of the negative electrode active material supported on the negative electrode was set to 5.5 mg/cm².

AC impedance at 1 kHz of the thus-obtained lithium ion secondary battery was measured using SOLARTRON 12608W (trade name; manufactured by SOLARTRON Analytical), whereby a value of 110 mΩ was obtained.

Subsequently, the thus-obtained lithium ion secondary battery was subjected to constant-current charging with a constant current value (100 mA), corresponding to a charging current value of 1C, at 25° C. until the voltage value increased to 4.2 V, and a charge capacity 4.2V-1CCC was measured.

Furthermore, similarly, the thus-fabricated lithium ion secondary battery was subjected to constant-current charging with a constant current value (100 mA), corresponding to a charging current value of 1C, at 25° C. until the voltage value increased to 4.2 V Subsequently, the battery was subjected to constant-voltage charging while maintaining the voltage value at 4.2 V until the charging current value fell to 5 mA, and a charge capacity 4.2V-1CCCCV was measured.

A ratio between the thus-measured charge capacity 4.2V-1CCC and the charge capacity 4.2V-1CCCCV was calculated to be 94.0%.

Example 5

A lithium ion secondary battery was fabricated in the same manner as in Example 1, except that $LiCoO_2$ was used as the positive electrode active material.

AC impedance at 1 kHz of the thus-obtained lithium ion secondary battery was measured using SOLARTRON 12608W (trade name; manufactured by SOLARTRON Analytical), whereby a value of 66 mΩ was obtained.

Subsequently, the thus-obtained lithium ion secondary battery was subjected to constant-current charging with a constant current value (100 mA), corresponding to a charging current value of 1C, at 25° C. until the voltage value increased to 4.2 V, and a charge capacity 4.2V-1CCC was measured.

Furthermore, similarly, the thus-fabricated lithium ion secondary battery was subjected to constant-current charging with a constant current value (100 mA), corresponding to a charging current value of 1C, at 25° C. until the voltage value increased to 4.2 V Subsequently, the battery was subjected to constant-voltage charging while maintaining the voltage value at 4.2 V until the charging current value fell to 5 mA, and a charge capacity 4.2V-1CCCCV was measured.

A ratio between the thus-measured charge capacity 4.2V-1CCC and the charge capacity 4.2V-1CCCCV was calculated to be 97.5%.

Comparative Example 1

A lithium ion secondary battery was fabricated in the same manner as in Example 1, except that the amount of the positive electrode active material supported on the positive electrode was set to 15.5 $mg/cm^2$ and the amount of the negative electrode active material supported on the negative electrode was set to 8.8 $mg/cm^2$.

AC impedance at 1 kHz of the thus-obtained lithium ion secondary battery was measured using SOLARTRON 12608W (trade name; manufactured by SOLARTRON Analytical), whereby a value of 180 mΩ was obtained.

Subsequently, the thus-obtained lithium ion secondary battery was subjected to constant-current charging with constant current value (100 mA), corresponding to a charging current value of 1C, at 25° C. until the voltage value increased to 4.2 V, and a charge capacity 4.2V-1CCC was measured.

Furthermore, similarly, the thus-fabricated lithium ion secondary battery was subjected to constant-current charging with a constant current value (100 mA), corresponding to a charging current value of 1C, at 25° C. until the voltage value increased to 4.2 V Subsequently, the battery was subjected to constant-voltage charging while maintaining the voltage value at 4.2 V until the charging current value fell to 5 mA, and a charge capacity 4.2V-1CCCCV was measured.

A ratio between the thus-measured charge capacity 4.2V-1CCC and the charge capacity 4.2V-1CCCCV was calculated to be 89.0%.

Comparative Example 2

A lithium ion secondary battery was fabricated in the same manner as in Example 1, except that the amount of the positive electrode active material supported on the positive electrode was set to 26.5 $mg/cm^2$ and the amount of the negative electrode active material supported on the negative electrode was set to 14.5 $mg/cm^2$.

AC impedance at 1 kHz of the thus-obtained lithium ion secondary battery was measured using SOLARTRON 12608W (trade name; manufactured by SOLARTRON Analytical), whereby a value of 250 mΩ was obtained.

Subsequently, the thus-obtained lithium ion secondary battery was subjected to constant-current charging with a constant current value (100 mA), corresponding to a charging current value of 1C, at 25° C. until the voltage value increased to 4.2 V, and a charge capacity 4.2V-1CCC was measured.

Furthermore, similarly, the thus-fabricated lithium ion secondary battery was subjected to constant-current charging with a constant current value (100 mA), corresponding to a charging current value of 1C, at 25° C. until the voltage value increased to 4.2 V Subsequently, the battery was subjected to constant-voltage charging while maintaining the voltage value at 4.2 V until the charging current value fell to 5 mA, and a charge capacity 4.2V-1CCCCV was measured.

A ratio between the thus-measured charge capacity 4.2V-1CCC and the charge capacity 4.2V-1CCCCV was calculated to be 81.0%.

Examples 1 to 5 indicate that a lithium ion secondary battery whose amount of a positive electrode active material supported on a positive electrode is 10 $mg/cm^2$ or less and that of a negative electrode active material supported on a negative electrode is 5.510 $mg/cm^2$ or less exhibits low AC impedance at 1 kHz; thereby enabling charging, only with constant-current charging, to 90% or more of a charge capacity in a case where the battery is charged in accordance with the related-art constant-current, constant-voltage charging. Accordingly, by making use of a charging device having a simple circuit configuration and with monitoring of only a voltage value, the lithium ion secondary battery can be charged with an extremely simple operation and at low cost.

In contrast, Comparative Examples 1 and 2 indicate that a lithium ion secondary battery, whose amount of a positive electrode active material on a positive electrode and that of a negative electrode active material supported on a negative electrode is high, exhibits high AC impedance at 1 kHz. Accordingly, the battery cannot be charged to a charge capacity only with constant-current charging.

Needless to say, the invention is not limited to the above embodiment, and can be modified in various manners within the scope of the invention as set forth in the appended claims; and the scope of the invention encompasses such modifications.

For instance, in the embodiment and Examples, the constant-current charging of the lithium ion secondary battery is performed with set charging value set to 1C.

However, the charging current value is not necessarily set to 1C, and an essential requirement is to set the charging current value within a range of equal to or greater than 0.5C and less than 2C.

Furthermore, in the embodiment, the lithium ion secondary battery 1 has three laminate units 5 which are laminated with the separators 6 therebetween. However, the lithium ion secondary battery 1 does not necessarily have three laminate units 5, and may be have a single laminate unit 5, or two laminate units 5 which are laminated with the separator 6 therebetween. Further alternatively, the lithium ion secondary battery 1 may have four or more laminate units 5 which are laminated with the separators 6 therebetween.

What is claimed is:
1. A lithium ion secondary battery comprising:
a positive electrode which comprises, as a positive electrode active material, a $LiMn_{1/3}Ni_{1/3}Co_{1/3}O_2$ composite metal oxide as a metal component thereof, wherein said positive electrode supports from 5 mg/cm² to 7.7 mg/cm² of said positive electrode active material;
a negative electrode which comprises a negative electrode active material, wherein said negative electrode supports from 3 mg/cm² to 4.5 mg/cm² of said negative electrode active material; and
a nonaqueous electrolyte solution comprising a lithium salt.

2. The lithium ion secondary battery according to claim 1, wherein said lithium ion secondary battery comprises a plurality of laminate units laminated with a separator therebetween, each laminate unit comprising said positive electrode, a separator, and said negative electrode while being laminated one on top of the other.

3. The lithium ion secondary battery according to claim 1, wherein said positive electrode supports from 5 mg/cm² to 7.7 mg/cm² of said positive electrode active material pressed on a surface thereof, and said negative electrode supports from 3 mg/cm² to 4.5 mg/cm² of said negative electrode active material pressed on a surface thereof.

4. The lithium ion secondary battery according to claim 1, wherein said positive electrode supports from 5.5 mg/cm² to 7.7 mg/cm² of said positive electrode active material, and said negative electrode supports from 3.5 mg/cm² to 4.5 mg/cm² of said negative electrode active material.

5. The lithium ion secondary battery according to claim 1, wherein said positive electrode supports from 6.2 mg/cm² to 7.7 mg/cm² of said positive electrode active material, and said negative electrode supports from 4 mg/cm² to 4.5 mg/cm² of said negative electrode active material.

6. The lithium ion secondary battery according to claim 1, wherein said positive electrode supports from 5 mg/cm² to 6.2 mg/cm² of said positive electrode active material, and said negative electrode supports from 3 mg/cm² to 4 mg/cm² of said negative electrode active material.

7. The lithium ion secondary battery according to claim 1, wherein said positive electrode supports from 5 mg/cm² to 5.5 mg/cm² of said positive electrode active material, and said negative electrode supports from 3 mg/cm² to 3.5 mg/cm² of said negative electrode active material.

8. A method for charging a lithium ion secondary battery comprising: a positive electrode which comprises, as a positive electrode active material, a $LiMn_{1/3}Ni_{1/3}Co_{1/3}O_2$ composite metal oxide as a metal component thereof, wherein said positive electrode supports from 5 mg/cm² to 7.7 mg/cm² of said positive electrode active material; a negative electrode which comprises a negative electrode active material, wherein said negative electrode supports from 3 mg/cm² to 4.5 mg/cm² of said negative electrode active material; and a nonaqueous electrolyte solution comprising a lithium salt, wherein said method consists of constant-current charging under varying voltage and at a set charging current value of equal to or greater than 0.5C and less than 2C.

9. The method for charging a lithium ion secondary battery according to claim 8, wherein said lithium ion secondary battery comprises a plurality of laminate units laminated with a separator there between, each laminate unit comprising said positive electrode, a separator, and said negative electrode while being laminated one on top of the other.

10. The method for charging a lithium ion secondary battery according to claim 8, wherein said positive electrode supports from 5 mg/cm² to 7.7 mg/cm² of said positive electrode active material pressed on a surface thereof, and said negative electrode supports from 3 mg/cm² to 4.5 mg/cm² of said negative electrode active material pressed on a surface thereof.

11. The method for charging a lithium ion secondary battery according to claim 8, wherein said positive electrode supports from 5.5 mg/cm² to 7.7mg/cm² of said positive electrode active material, and said negative electrode supports from 3.5 mg/cm² to 4.5 mg/cm² of said negative electrode active material.

12. The method for charging a lithium ion secondary battery according to claim 8, wherein said positive electrode supports from 6.2 mg/cm² to 7.7 mg/cm² of said positive electrode active material, and said negative electrode supports from 4 mg/cm² to 4.5 mg/cm² of said negative electrode active material.

13. The method for charging a lithium ion secondary battery according to claim 8, wherein said constant-current charging is carried out under varying voltage until a set voltage value $\Delta E0$ is obtained.

14. The method for charging a lithium ion secondary battery according to claim 13, wherein said set voltage value $\Delta E0$ is 4.2 ±0.05 V.

15. The method for charging a lithium ion secondary battery according to claim 13, wherein said set voltage value $\Delta E0$ is 2.7 ±0.05 V.

16. The method for charging a lithium ion secondary battery according to claim 8, wherein said positive electrode supports from 5 mg/cm² to 6.2 mg/cm² of said positive electrode active material, and said negative electrode supports from 3 mg/cm² to 4 mg/cm² of said negative electrode active material.

17. The method for charging a lithium ion secondary battery according to claim 8, wherein said positive electrode supports from 5 mg/cm² to 5.5 mg/cm² of said positive electrode active material, and said negative electrode supports from 3 mg/cm² to 3.5 mg/cm² of said negative electrode active material.

* * * * *